Feb. 21, 1956  W. J. BOWAN ET AL  2,735,700
PACKED SCREW THIMBLE PIPE JOINT
Filed April 1, 1952  2 Sheets-Sheet 2
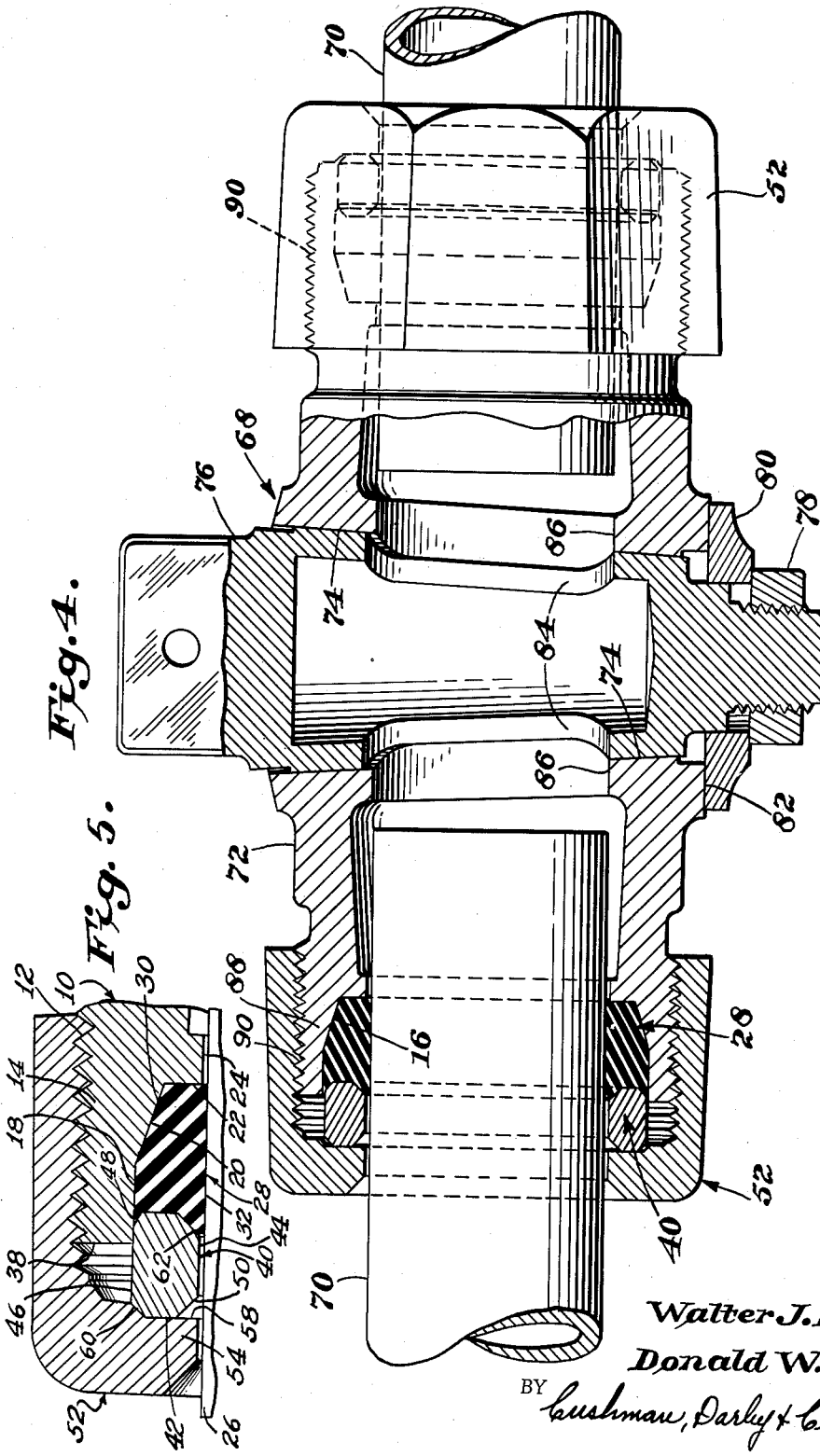
INVENTORS:
Walter J. Bowan,
Donald W. Ferry,
BY Cushman, Darby & Cushman
ATTORNEYS

United States Patent Office 2,735,700
Patented Feb. 21, 1956

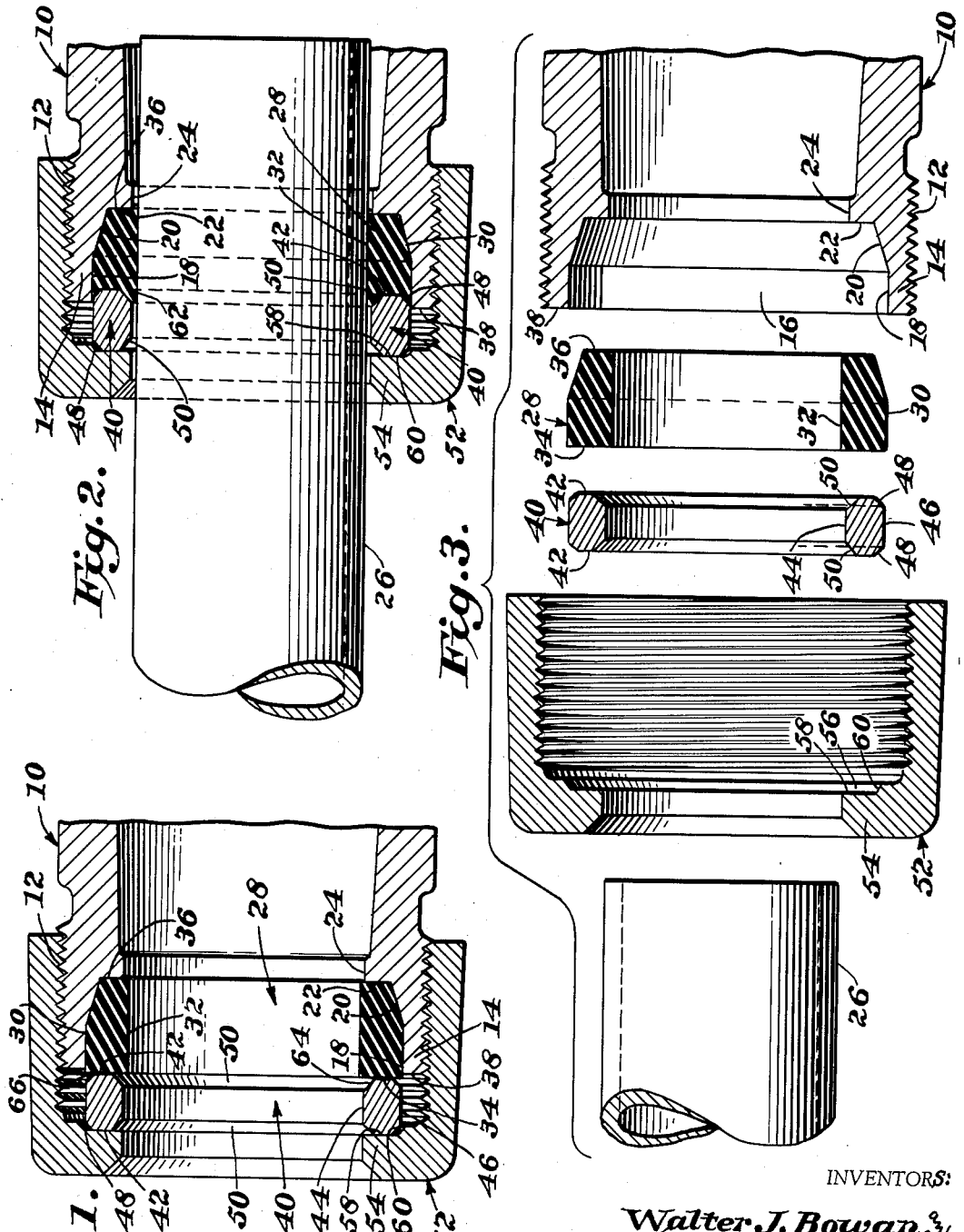

2,735,700

PACKED SCREW THIMBLE PIPE JOINT

Walter J. Bowan and Donald W. Ferry, Decatur, Ill., assignors to Mueller Co., Decatur, Ill., a corporation of Illinois Application April 1, 1952, Serial No. 279,822

2 Claims. (Cl. 285—122)

This invention pertains to pipe joints or couplings, and more particularly to a pipe joint or fitting of the packed socket type for effecting a connection with plain end pipes or tubes.

Pipe joints of the type under consideration, and which may be termed compression joints, are well known in the art and, in general, consist of a hollow body which is interiorly enlarged at its terminal end to provide an annular recess for packing that engages the exterior surface of a smooth walled pipe or tube inserted or telescoped within the fitting. A coupling nut is threaded onto the body for compressing the packing into tight sealing engagement with both the walls of the recess in the fitting and the exterior wall of the inserted pipe. In order to avoid tearing or otherwise damaging the packing, which usually is of rubber or similar resilient material, by rotation of the coupling nut thereagainst, a metallic follower ring or washer usually is interposed between the packing and the coupling nut. In addition to the afore-described function, the follower ring also serves to reduce the force required to tighten the coupling nut, i. e., rotate the same in a joint tightening direction, since the friction between metal-to-metal contacting surfaces is considerably less than that between metal-to-rubber contacting surfaces.

Joints of this nature presently in use, however, have various disadvantages. Among these may be mentioned the fact that relative axial and other movements between the fitting and the inserted pipe tend to wear the gasket away at its pipe engaging surface. This loss of rubber by abrasion tends to cause the joint to lose compression and thereby leak unless the coupling nut is tightened further. Also, many of the known types of compression joints of this nature do not have sufficient "pull-out" strength. This expression refers to the force necessary to pull the inserted pipe out of the fitting after the coupling nut has been tightened. In still other types of joints of this nature the fitting must be disassembled, i. e., the coupling nut and follower ring removed and slipped over the pipe, before the latter may be inserted into the fitting. The necessity of such operation is not only time-consuming, but also wasteful of labor when a considerable number of such joints are to be installed. Still other types of compression joints will not hold under high pressure without leaking, while some are relatively complicated, which adds to the cost of their manufacture.

Accordingly, it is an object of this invention to provide an improved pipe joint of the type under consideration which is simple in design, and consequently inexpensive to manufacture.

It is another object of this invention to provide an improved compression pipe joint which will not leak under high pressure and has a high "pull-out" strength.

It is another object of this invention to provide a fitting for a compression pipe joint of the type under consideration into which a smooth-walled pipe may be inserted and a tight joint effected without disassembly of the fitting parts.

It is still another object of this invention to provide an improved compression joint which permits a maximum occurrence of relative axial and other movements between the fitting and the pipe without leakage.

It is a further object of this invention to provide an improved pipe joint of the type under consideration which may be assembled and an effective joint established with a minimum of skill.

Other objects and advantages of the invention will become evident from the following description and accompanying drawings, in which:

Figure 1 is a fragmentary longitudinal sectional view of a joint fitting embodying this invention and showing the parts in position for reception of a smooth-walled pipe.

Figure 2 is a view corresponding to Figure 1, but showing a pipe inserted within the fitting and the coupling nut tightened to compress the gasket.

Figure 3 is an exploded view of the parts of the joint shown in Figure 2.

Figure 4 is a side view, partly in section, of a stop or rotary plug valve provided with fittings embodying this invention.

Figure 5 is an enlarged, fragmentary sectional view of a portion of Figure 2.

Referring now to Figures 1 and 3 of the drawings, the fitting includes a tubular body 10 having exterior threads 12 on its terminal portion 14. The body 10 may constitute the end of a pipe for effecting a bell and spigot connection, may constitute the inlet or outlet end of a valve or other member, or may consist of a separate fitting, such as an elbow, a T, etc. The terminal portion 14 of the body 10 is interiorly enlarged to provide an annular packing recess 16 (Figure 3) having an outer smooth-walled cylindrical section 18 which merges at its inner end into an inwardly tapering frusto-conical section 20. This latter section 20 terminates at its inner end in a flat shoulder 22 which is centrally apertured, as at 24, for reception of a tube or pipe 26 having smooth exterior walls.

Disposed within the packing recess 16 is an annular packing gasket 28, preferably of rubber or other resilient material having similar packing qualities. The outer surface 30 of the gasket 28 is complementary to the walls of the packing recess 16 while the inner surface 32 of the gasket is cylindrical and of a diameter to snugly receive, without undue forcing, the smooth-walled tube or pipe 26. The inner diameter of the gasket 28 normally is slightly less than that of the pipe receiving aperture 24. The opposite ends 34 and 36 of the gasket 28 are flat, i. e., plane surfaces disposed perpendicular to the axis of the gasket. The outer end 34 of the gasket 28, when the latter is disposed within the packing recess 16 in the body 10, projects only very slightly beyond the outer end 38 of the body, and for all practical purposes is substantially flush with such end 38.

Engaged against the outer end 34 of the gasket 28 is a metallic rigid packing or follower ring 40 having flat end faces 42 and cylindrical inner and outer surfaces 44 and 46, respectively. The outer diameter of the packing ring 40 is only very slightly less than the diameter of the cylindrical section 18 of the packing recess 16, so that when the packing ring is forced against the gasket 28, as later described, the ring may be received within the cylindrical section of the packing recess, as shown in Figure 2. The inner diameter of the packing ring 40 is substantially equal to that of the pipe receiving aperture 24 in the body 10 of the fitting. The outer edges of the follower ring 40 are slightly bevelled, as at 48, while the inner edges of the follower ring are bevelled, as at 50, to a somewhat greater extent, as shown best in Figure 5. The function of these bevelled edges 48 and 50 will be described later.

Engaged with the threads 12 on the body 10 is a coupling nut 52 having a radially inwardly directed annular flange 54 at its outer end for engagement with the outer end or face of the follower ring 40. The inner surface of this flange 54 is provided with a shallow recess 56 having a flat bottom wall 58 and an inclined outer wall 60. When the parts are assembled, as shown in Figure 1, so that the coupling nut 52 is tightened only sufficiently to engage the follower ring 40 against the gasket 28 without compressing the latter, the recess 56 in the nut serves to center the follower ring with reference to the gasket and the body 10, and to prevent such ring from becoming transversely displaced to an extent which would make it impossible to insert the pipe 26 into the fitting without removing the coupling nut and follower ring. In this connection, it will be noted that the outer bevelled edge 48 on the outer end of the ring 40 cooperates with the inclined wall 60 of the recess 56 to facilitate such centering action.

In use of the fittings and as shown in Figure 2, the smooth-walled tube or pipe 26 is inserted therein to extend a practical distance beyond the pipe receiving aperture 24. Thereupon the coupling nut 52 is tightened to effect a tight leak-proof joint. Upon such tightening of the nut 52, the follower ring 40 is forced into engagement with the outer flat end face 34 of the gasket 28, thereby exerting a considerable thrust against such end face substantially in longitudinal alignment with the tapered or inclined wall section 20 of the packing recess 16. This wall section 20 therefore exerts a reaction force on the gasket 28, which force has a radially inwardly directed component to thereby contract the gasket into tight sealing engagement with the outer surface of the pipe 26. This radial reaction force component exists in an annular band substantially coextensive with the axial length of the frusto-conical section 20 of the recess.

Since rubber is not compressible but only deformable, when the coupling nut 52 is tightened, as shown best in Figure 5, rubber flows, as at 62, into the space 64, triangular in radial section, formed by the inner edge bevel 50 at the inner end of the follower ring 40, the outer surface of the pipe 26, and the flat outer end 34 of the gasket, as shown in Figure 1. Rubber additionally flows into the similar space 66 (Figure 1) formed by the outer edge bevel 48, but since such bevel is relatively slight and the resulting space 66 is correspondingly small, the flowing of rubber at this point is of no appreciable significance. The flowing of rubber into the space 64 formed by the inner edge bevel 50, however, produces an improved result in the joint.

Since rubber is inherently resilient and tends to resume its original shape, the rubber deformed into the space 64 formed by the inner edge bevel 50 constantly exerts a spring-like force on the gasket 28 tending to maintain compression thereon. As a result, should sufficient relative axial movement, or even other movements such as disaligning movements, take place between the body 10 and the pipe 26 to abrade or wear away some of the rubber of the gasket at its inner cylindrical surface 32, the aforementioned spring-like force tends to maintain sufficient compression on the gasket to prevent leakage. This result has been proved by numerous "cycling" tests wherein the pipe 26 was repeatedly reciprocated in the fitting, with fluid pressure in the joint, until leakage eventually occurred. The number of reciprocations necessary to cause such leakage is unusually high. Additionally, it has been found in actual practice that the joint not only has exceptionally high "pull-out" strength, but also will withstand extremely high pressure without leakage.

While the inner edge bevel 50 is the simplest and easiest method of providing a space into which the rubber gasket may be deformed to accomplish the afore-described result, other constructions are possible. For example, an annular or circumferential recess or groove in the inner end and midway between the edges of the follower ring 40 obviously would provide such a space. It is pointed out, however, that a large area of engagement between flat faces on the ring 40 and the gasket 28 in approximate longitudinal alignment with the tapered recess wall surface 20, as shown best in Figure 5, is also desirable in order to utilize the tapered surface to its fullest advantage, as previously described. While the outer edge bevel 48 detracts somewhat from the "flat face" engagement, such bevel is so slight as to have no appreciable disadvantage in this respect. It is further pointed out that compression of the rubber, to obtain the desired tight seal, is more easily achieved by confining the gasket 28 between the axially opposed flat surfaces of the shoulder 22 and the ring 40, respectively.

Because the outer diameter of the follower ring 40 is only very slightly less than the diameter of the outer cylindrical section 18 of the packing recess 16, the gasket 28 is not extruded through this small clearance as the follower ring 40 moves into the recess 16. Hence, no rubber is "pinched off" at the outer edge of the outer end face 34 of the gasket 28 when the coupling nut 52 is tightened. The follower ring 40 is bevelled on all four edges merely to assure that no matter which way the ring is assembled in the joint, i. e., whichever end 42 of the ring engages the gasket 28, the ring will be both centered by the recess 56 in the coupling nut 52 and will provide the necessary space 64 for gasket rubber to flow into in order to obtain the aforedescribed compression-maintaining feature.

As an example of the use of the invention, Figure 4 illustrates its application to a stop or a rotary plug valve 68 to enable the same to be connected into a line without the necessity of threading the ends of the pipes 70. The stop 68 consists of a tubular body 72 having a transverse tapered bore providing a valve seat 74 for the reception of a correspondingly tapered rotary key or plug 76. This plug 76 is held within its seat 74 by a nut 78 on the smaller projecting end thereof and a thrust washer 80 interposed between the nut and a bearing surface 82 on the body 72. In this instance the plug 76 is shown as being hollow and having ports 84 adapted to be aligned with the seat ports 86 in the body 72 for passage of fluid through the valve. The terminal portions 88 of each end of the body 72 are provided with exterior threads 90 and are interiorly enlarged to provide annular packing recesses 16 corresponding exactly to that shown in Figures 1 to 3. The gaskets 28, follower rings 40, and coupling nuts 52 likewise correspond to those shown in these figures.

It will thus be seen that the objects of this invention have been fully and effectively accomplished. It will be realized, however, that the specific embodiment shown and described to illustrate the principles of this invention are subject to modification without departing from such principles. Therefore, this invention includes all modifications encompassed within the spirit and scope of the following claims.

We claim:

1. In a pipe joint the combination comprising: a hollow body having a terminal portion provided with an annular packing recess terminating at the inner end thereof in a flat annular shoulder forming a pipe-receiving aperture of less diameter than that of said recess, said recess having an outer cylindrical section merging into an inner, inwardly-tapering section which terminates in said shoulder; a yielding resilient rubber-like annular gasket complementary to said recess, disposed therein, and having a flat outer end face substantially flush with the outer end of said recess when said gasket is relaxed; a reversible rigid follower ring directly engaged with said gasket and of an outer diameter to be snugly received in said cylindrical section of said recess and an inner diameter to snugly embrace the pipe, the opposite ends of said ring being of identical configuration and each having a flat end face normal to the axis of said ring and of a radial width equal to at least a major portion of the radial width of said ring, at least a major portion of the longitudinal projection of said tapering recess section being in longitudinal alignment with said ring flat end face engaged with said gasket, each of said ring ends having a beveled radially-inner edge which when opposed to said gasket end face defines an annular cavity for flow of gasket material thereinto, the radial width of said cavity being relatively small as compared to that of said ring flat end faces; and means connected to said body for forcefully urging said ring against said gasket, whereby said ring flat end face engaged with said gasket immediately compresses the latter against said tapering recess section to constrict the inner section of said gasket about the pipe and on further compression to effect flow of resilient gasket material into said cavity to continuously maintain compression on said gasket on any wear of that surface thereof in contact with the pipe.

2. The structure defined in claim 1 wherein the body is provided with exterior threads and the ring urging means comprises a coupling nut having an inwardly-directed radial flange engaging the ring, the ring-engaging face of said flange having a shallow annular recess of substantially the same radial width as and opposed to said ring for reception and centering thereof, the outer wall of said recess being tapered inwardly toward the bottom of said recess, and the radially-outer edge of the opposed end of the ring having a bevel complementary to said tapered wall to facilitate reception of said ring in said flange recess.

References Cited in the file of this patent

UNITED STATES PATENTS

| | | |
|---|---|---|
| 927,611 | Stallings | July 13, 1909 |
| 1,396,135 | Merriweather | Nov. 8, 1921 |
| 1,595,310 | Mueller et al. | Aug. 10, 1926 |
| 1,873,620 | Moore | Aug. 23, 1932 |
| 1,873,621 | Moore | Aug. 23, 1932 |
| 1,989,674 | Boas et al. | Feb. 5, 1935 |
| 2,075,947 | Kennedy | Apr. 6, 1937 |
| 2,087,752 | Carson | July 20, 1937 |
| 2,101,894 | Boughton | Dec. 14, 1937 |
| 2,509,118 | Warren | May 23, 1950 |
| 2,567,243 | Smith | Sept. 11, 1951 |